US005639139A

United States Patent [19]
Rush

[11] Patent Number: 5,639,139
[45] Date of Patent: Jun. 17, 1997

[54] TELESCOPING TRAILER

[76] Inventor: L. C. Rush, P.O. Box 105, Markham, Tex. 77456

[21] Appl. No.: 661,382

[22] Filed: Jun. 11, 1996

[51] Int. Cl.⁶ .................................................. B62D 33/00
[52] U.S. Cl. ...................... 296/26; 296/181; 280/763.1; 280/767
[58] Field of Search ................................ 296/26, 27, 181; 280/763.1, 767, 261, 255, 414.2, 638, 475, DIG. 11

[56] References Cited

U.S. PATENT DOCUMENTS

| Re. 32,262 | 10/1986 | Stewart | 296/171 |
|---|---|---|---|
| D. 168,535 | 1/1953 | Couse | D14/3 |
| 2,457,581 | 12/1948 | McCain | 296/23 |
| 2,490,014 | 12/1949 | Brand | 296/26 |
| 2,606,057 | 8/1952 | Johnson | 296/23 |
| 2,788,137 | 4/1957 | Harkness | 214/83.24 |
| 2,820,666 | 1/1958 | Grochmal | 296/23 |
| 2,995,398 | 8/1961 | Davenport | 296/26 |
| 3,107,116 | 10/1963 | Meaker | 296/23 |
| 3,705,638 | 12/1972 | Shock | 180/14 A |
| 3,722,947 | 3/1973 | Zucca | 296/26 |
| 4,133,571 | 1/1979 | Filios | 296/23 C |
| 4,846,489 | 7/1989 | Kleinebenne | 280/261 |
| 5,016,900 | 5/1991 | McCully | 280/477 |
| 5,118,155 | 6/1992 | Koop | 296/1.1 |
| 5,154,469 | 10/1992 | Morrow | 296/26 |

Primary Examiner—David M. Mitchell
Assistant Examiner—Jonathan J. Yun
Attorney, Agent, or Firm—Stephen R. Greiner

[57] ABSTRACT

A telescoping trailer adapted for towing by a land vehicle. The trailer includes an outer body supported by wheels and has an opening therein for slidably receiving a telescoping section. A drive assembly is secured to the telescoping section for frictionally engaging a drive wheel with a surface beneath the trailer and rotating the drive wheel to selectively extend and retract the telescoping section. An optional chain drive assembly is provided to the trailer for assisting the drive assembly in selectively moving the telescoping section relative to the outer body.

3 Claims, 8 Drawing Sheets

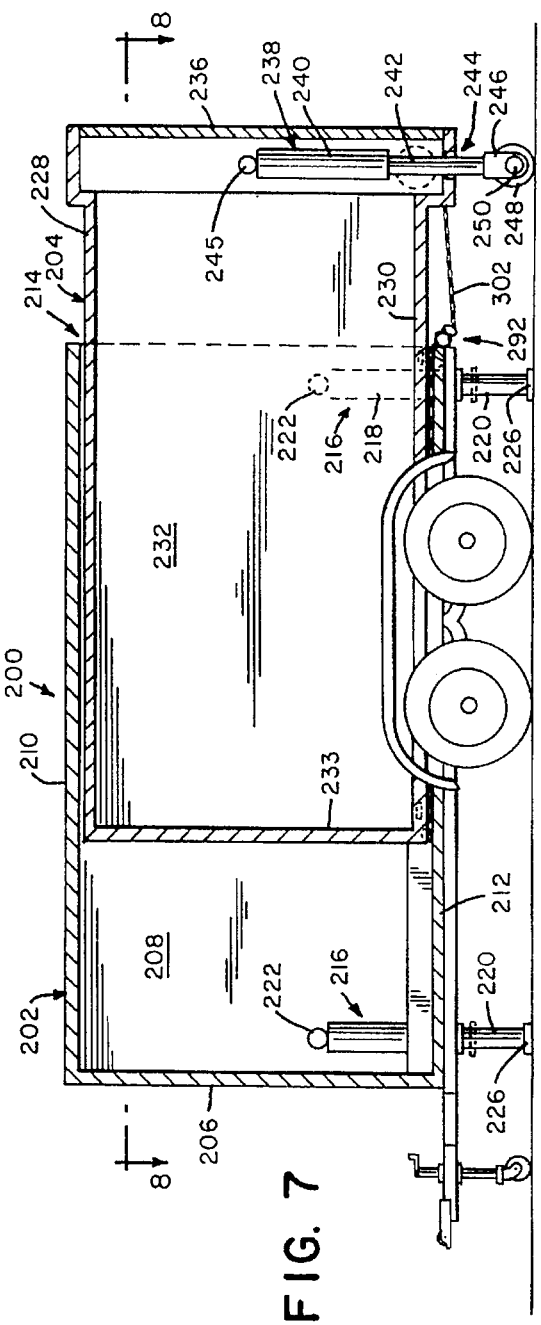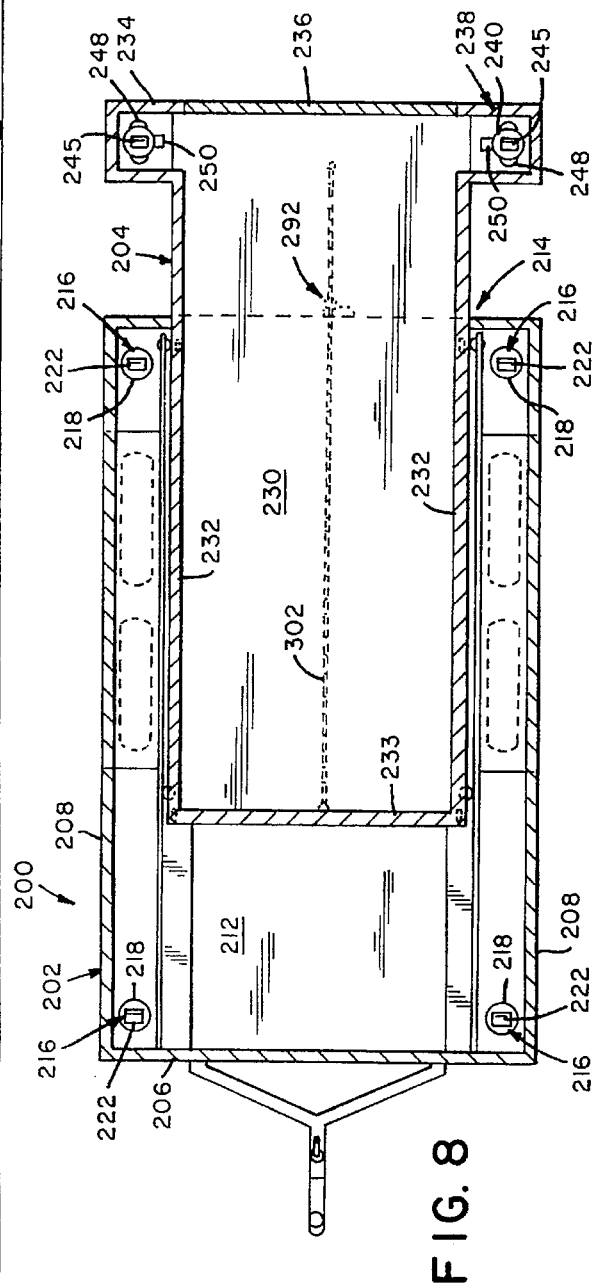

5,639,139

1

TELESCOPING TRAILER

FIELD OF THE INVENTION

The present invention relates generally to land vehicles and, more particularly, to trailers having telescoping sections.

BACKGROUND OF THE INVENTION

In the past, trailers have been constructed with telescoping sections for increasing their interior space. These telescoping sections, however, have proven to be difficult to extend and retract because of their relatively large size and weight. The normally snug fit between a telescoping section and the trailer body also contributes to the difficulties in moving the telescoping section. Frequently, the snug fit results in binding of the telescoping section against the trailer body when the trailer is telescopically moved on sloping or uneven terrain.

SUMMARY OF THE INVENTION

In light of the deficiencies presented by the prior art trailers, it is a principal object of the invention to provide a trailer with a telescoping section which may be easily extended and retracted by an individual on sloping or uneven terrain.

It is another object of the invention to provide improved means for levelling a trailer having a telescoping section.

It is a further object of the invention to provide a trailer of the type described with shelving which may be folded from a vertical, stowed position adjacent the side walls thereof to a horizontal, support position upon which myriad objects can be stored or displayed.

It is an object of the invention to provide improved elements and arrangements thereof in a telescoping trailer for the purposes described which is inexpensive, dependable and fully effective in accomplishing its intended purposes.

Briefly, the telescoping trailer in accordance with this invention achieves the intended objects by featuring an outer body supported by wheels and having an opening therein for slidably receiving a telescoping section. A drive assembly, secured to the telescoping section, may be operated to engage a drive wheel with the ground surface beneath the trailer and rotate the drive wheel to selectively extend or retract the telescoping section. An optional chain drive assembly is provided to the trailer for assisting the drive assembly in selectively moving the telescoping section relative to the outer body.

The foregoing and other objects, features and advantages of the present invention will become readily apparent upon further review of the following detailed description of the preferred embodiments as illustrated in the accompanying drawings.

BRIEF DESCRIPTION OF THE DRAWINGS

The present invention may be more readily described with reference to the accompanying drawings, in which:

FIG. 7 is a longitudinal cross-sectional view of an alternative telescoping trailer, said trailer being partially extended or telescoped.

FIG. 8 is a cross-sectional view along line 8—8 of FIG. 7.

Similar reference characters denote corresponding features consistently throughout the accompanying drawings.

DETAILED DESCRIPTION OF THE PREFERRED EMBODIMENTS

Figure 1:
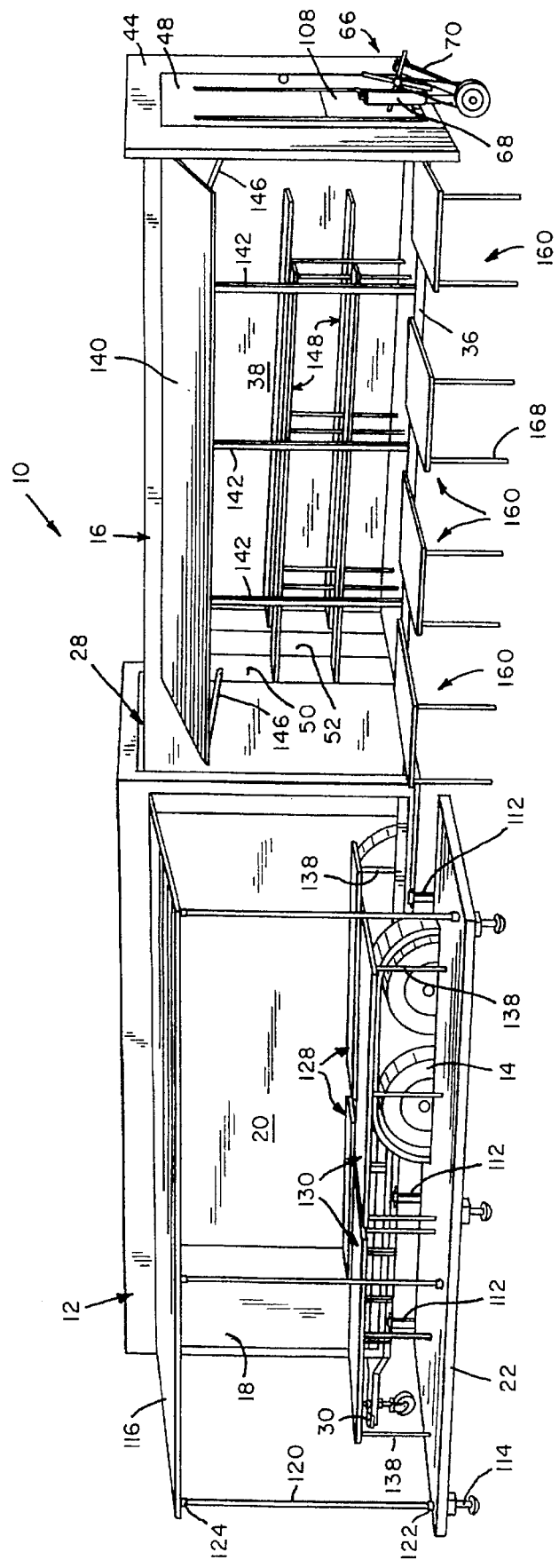
FIG. 1 is a perspective view of a telescoping trailer in accordance with the preferred embodiment of the present invention, said trailer being shown in a fully extended condition.

Referring now to FIGS. 1 through 6, a telescoping trailer in accordance with the present invention is shown at 10. The trailer includes an outer body 12 conventionally supported by wheels 14 and a telescoping section 16 for movement in and out of the outer body 12. The outer body 12 has a front wall 18, opposed side walls 20 and 22, a roof 24 and a floor 26 defining an interior chamber. The rear end of the outer body 12 is provided with an opening 28 to slidably receive the telescoping section 16. A draw bar 30 extends from the front end of the outer body 12 to permit the trailer 10 to be towed. Jacks 32 are affixed under each corner of the floor 26 for supporting and leveling the outer body 12 when the trailer 10 is at rest.

The telescoping section 16 of the trailer 10 includes a roof 34, a floor 36, opposed side walls 38 and 40, a front wall 42 and a rear wall 44. The front wall 42 is provided with a door 46 for access to the outer body 12. The rear wall 44 preferably extends beyond the periphery of the opening 28 to cooperate with the rear ends of the side walls 20 and 22, roof 24 and floor 26 of the outer body 12 in forming a weather resistant seal. A door 48 in the rear wall 44 permits entry into the telescoping section 16.

Between the front wall 42 and rear wall 44, the telescoping section 16 is provided with a partition wall 50 having a door 52. The partition wall 50 divides the telescoping section 16 into two separate spaces. The forward space, located between the front wall 42 and partition wall 50, may be sealed by the doors 46 and 52 and forms a vestibule for users. The space located rearward of tile partition wall 50 defines the principal storage area for tile telescoping section 16.

Figure 3:
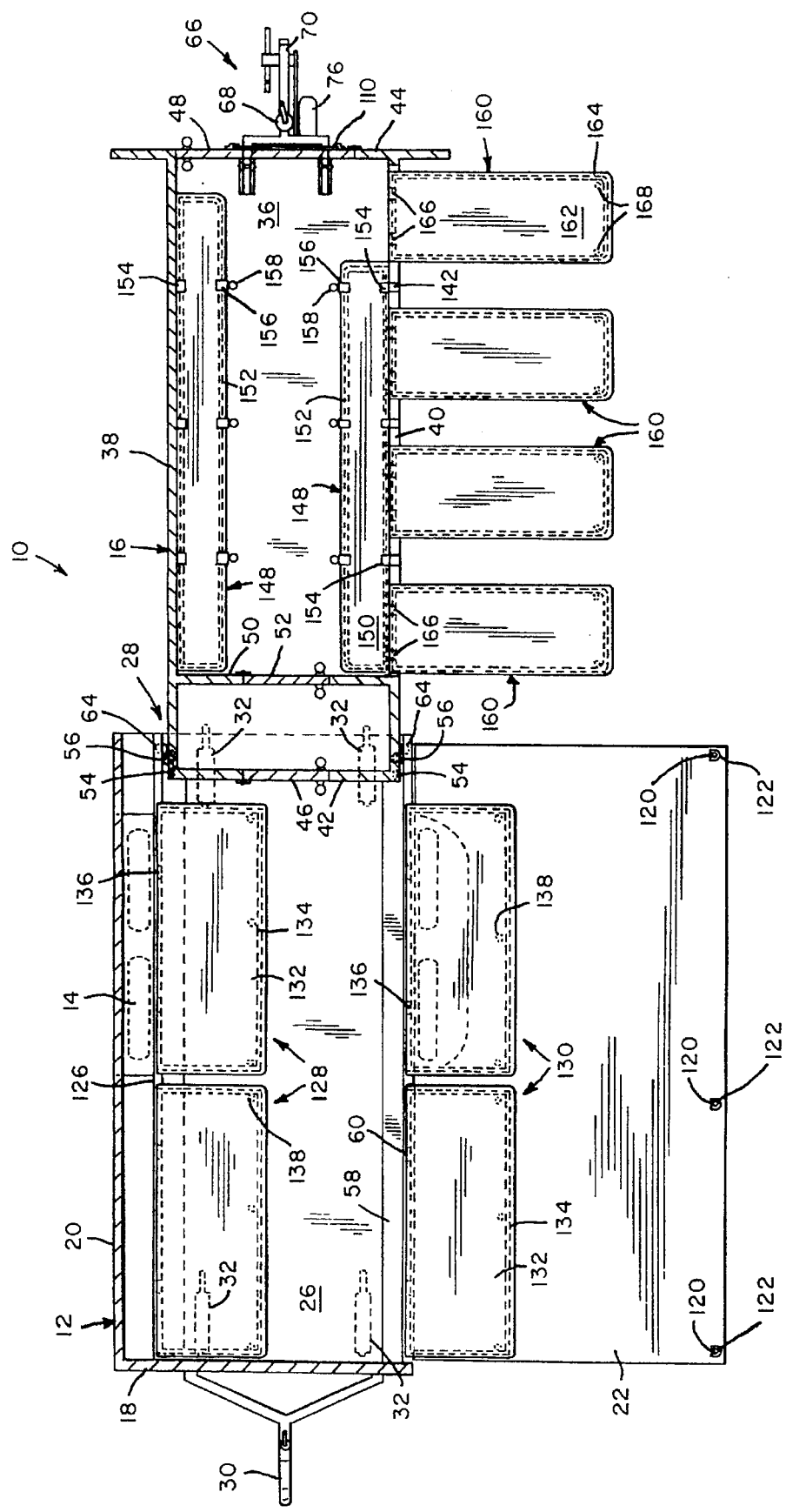
FIG. 3 is a cross-sectional view of the trailer taken along line 3—3 of FIG. 2.

The telescoping section 16 is provided with two pairs of rollers 54 and 56 to permit its easy movement relative to the outer body 12. One pair of rollers 54 is mounted beneath the front end of the telescoping section floor 26. As shown in FIG. 3, the rollers 54 are positioned for travelling along opposing tracks 58 which extend the entire the length of the outer body floor 26. The other pair of rollers 56 is secured to the floor 36 so as to ride against side rails 60 extending upwardly from opposite sides of the floor 26 adjacent the tracks 58. Thus, the rollers 54 support the front end of the telescoping section 16 whereas the rollers 56 provide lateral guidance thereto.

Figure 2:
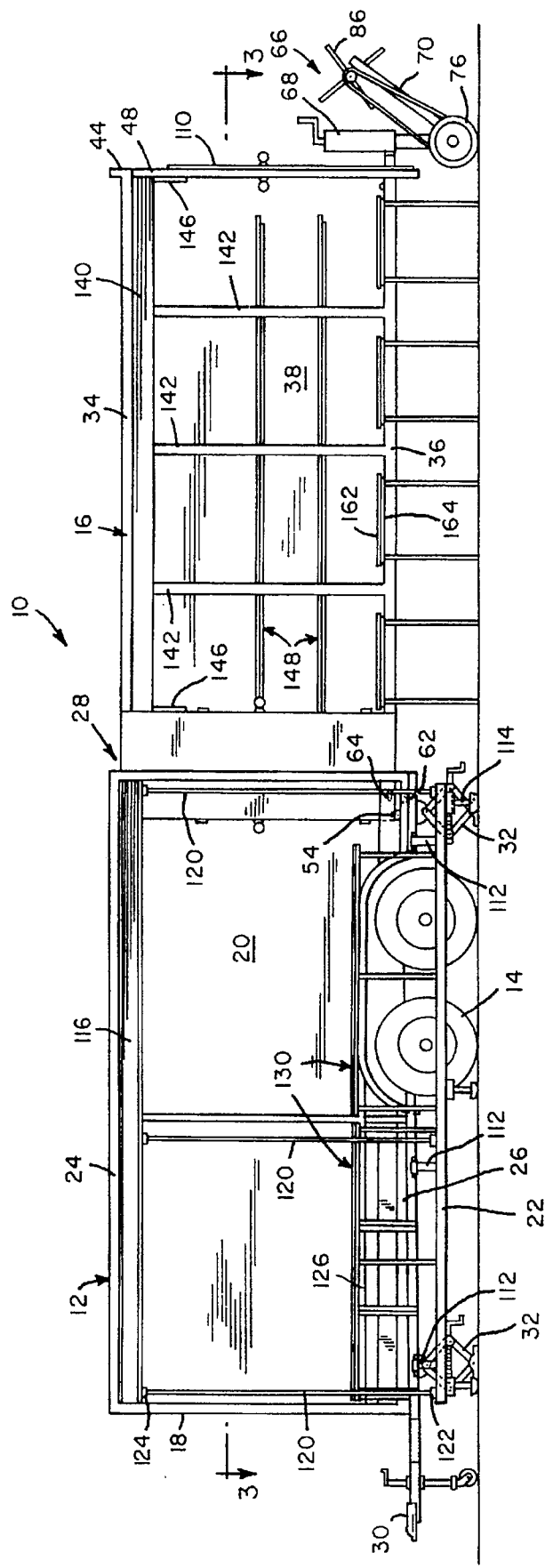
FIG. 2 is a side elevational view of the trailer of FIG. 1.

The rear end of the floor of the outer body 12 is provided with two pairs of rollers 62 and 64 to aid in moving the telescoping section 16 between retracted and extended positions. As shown in FIG. 2, a pair of rollers 62 extends upwardly from the outer body floor 26 to bear against the bottom of the floor 36 of the telescoping section 16. An additional set of rollers 64 is secured to the side rails 60 to engage the opposite sides of the floor 36.

A wheeled drive assembly 66 may be withdrawn from the rear of the trailer 10 for use in moving the telescoping section 16. The drive assembly 66 includes a jack portion 68 for elevating and supporting the telescoping section 16. A drive portion 70, affixed to the jack portion 68, permits the telescoping section 16 to be extended from, and retracted into, the outer body 12 with relative ease.

Figure 6:
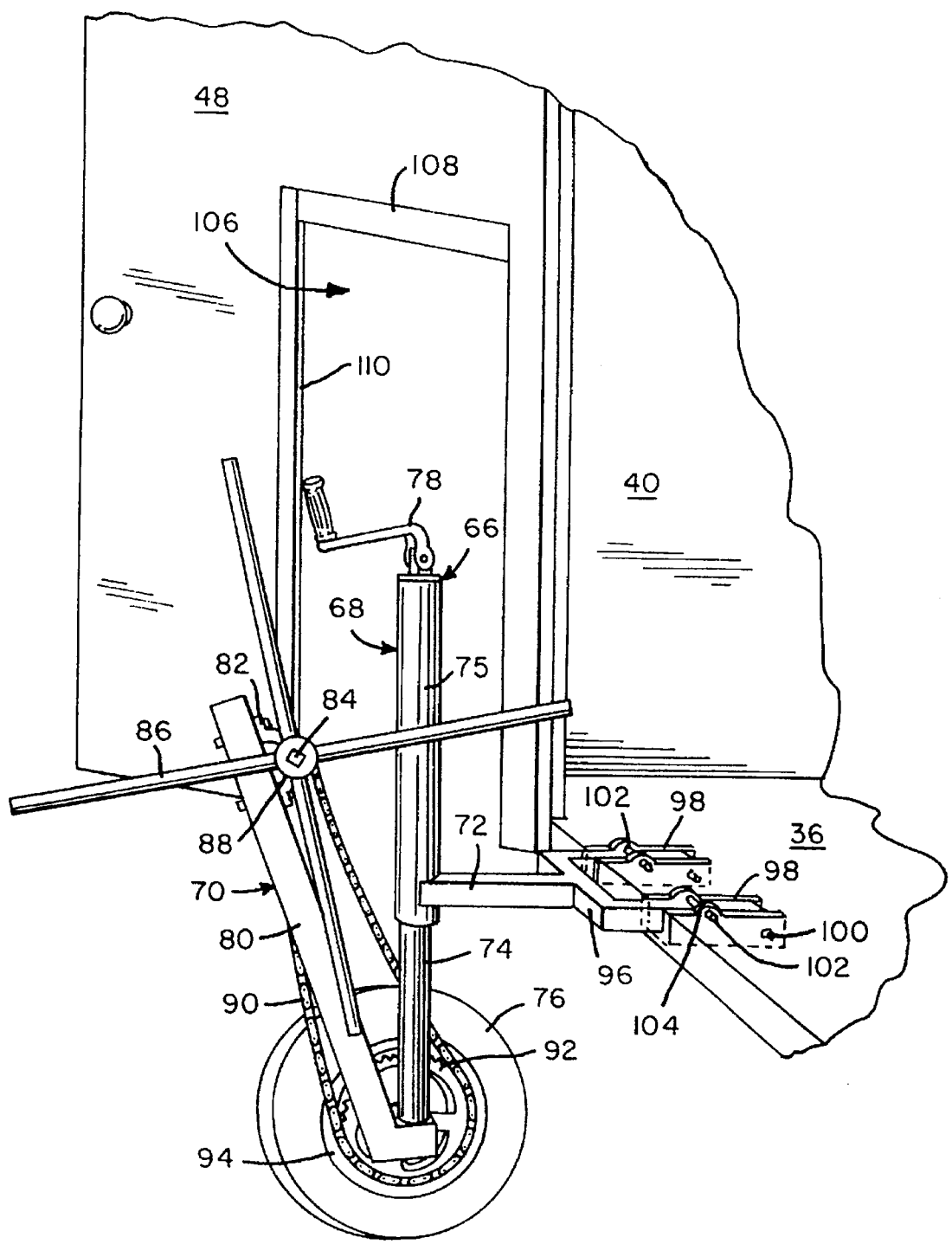
FIG. 6 is a perspective view of the preferred drive assembly secured to the rear of the telescoping section of the trailer.

With reference now to FIG. 6, the jack portion 68 may be seen to include a cylindrical sleeve 75 pivotally secured to the floor 36 of the telescoping section 16 by a Y-shaped support 72. A load-bearing rod 74 projects outwardly from within the sleeve 75 and rotatably carries a wheel 76 at its free end. A handle 78 is connected to the rod 74 by means of a conventional jackscrew arrangement (not shown) disposed within the sleeve 75. Thus, when the handle 78 is rotated, the rod 74 will selectively carry the wheel 76 toward or away from the sleeve 75.

The drive portion 70 includes an inclined support arm 80 having its lower end secured to the free end of the rod 74. A journal box 82 is secured to the free end of the support arm 80 and rotatably supports a shaft 84. To one end of the shaft 84 is affixed a hand crank 86 having a cruciform shape. A first sprocket gear 88 is affixed to the opposite end of the shaft 84. The first sprocket gear 88 is connected through an endless chain 90 to a second sprocket gear 92 affixed to the hub 94 of the wheel 76. Since the second sprocket gear 92 is preferably provided with a relatively greater number of teeth than the first sprocket gear 88, rotation of the hand crank 86 by a user results in rotation of the wheel 76 with a mechanical advantage.

Figure 4:
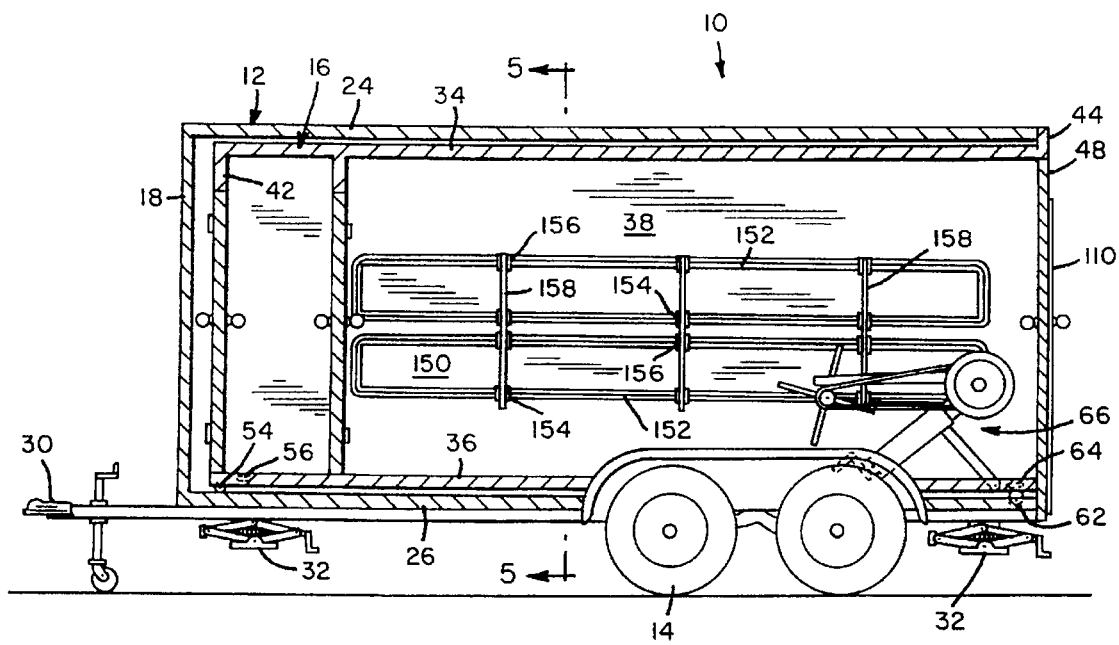
FIG. 4 is a partial longitudinal cross-sectional view of the trailer of FIG. 1 shown in a fully retracted condition.

When the drive assembly 66 is not in use, such as when the trailer 10 is being towed, it may be pivoted into the telescoping section 16 and stored there as illustrated in FIG. 4. To this end, the Y-shaped support 72 is provided with a pair of opposed pivot arms 96 which are received within a pair of U-shaped channel members 98 in the floor 36 of the telescoping section 16. A pivot pin 100 traversing the front ends of each of the pivot arms 96 and corresponding channel members 98 pivotally secures the drive assembly 66 to the telescoping section 16. A removable locking pin 102 passing through integral flanges 104 on opposite sides of each channel member 98 prevents pivoting movement of the drive assembly 66.

An opening 106 in the door 48 permits unimpeded movement of the door 48 when the drive assembly 66 is pivoted downwardly for engagement with the ground surface. The opening 106 may be closed when desired by a sliding panel 108 retained by brackets 110 affixed to the door 48 on opposite sides of the opening. The sliding panel 108 may be provided with a locking mechanism (not shown) to prevent unauthorized entry into the trailer 10.

Figure 5:
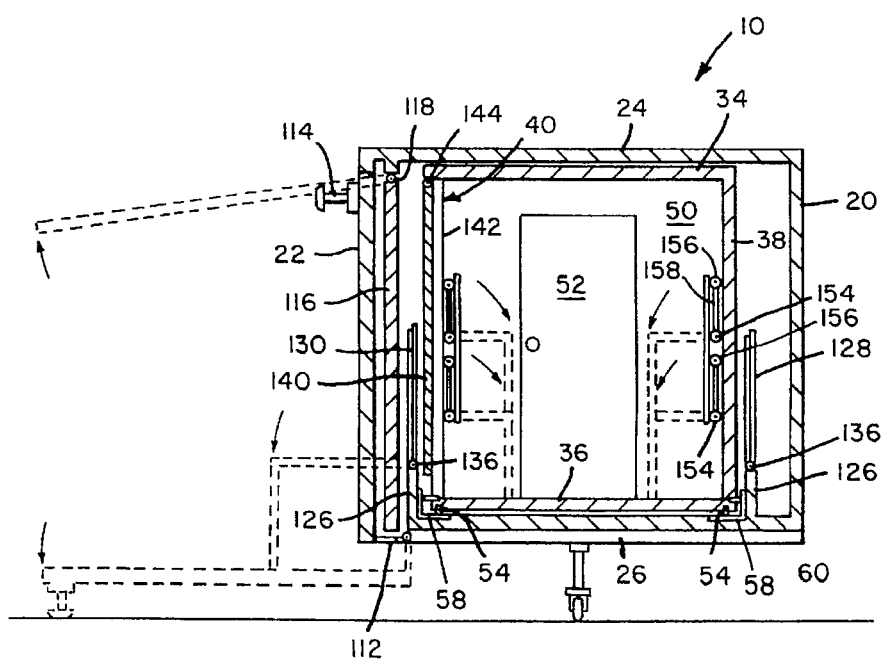
FIG. 5 is a cross-sectional view of the trailer taken along line 5—5 of FIG. 4.

The side wall 22 of the outer body 12 forms an elevated deck or platform upon which users of the trailer 10 may walk. Preferably, the side wall 22 is attached by hinges 112 to the floor 26 of the outer body 12. When desired, the side wall 22 may be pivoted, as shown in FIG. 5, from its normal, vertical orientation wherein both sides of the outer body 12 are closed to a horizontal position wherein one side of the outer body is open. Adjustable length legs 114 are secured along the free edge of the side wall 22 permit levelling thereof when utilized as a horizontal platform.

With continuing reference to FIG. 5, it may be seen that adjacent to the side wall 22 an awning panel 116 is suspended from the roof 24 of the outer body 12 by a hinge 118. When not in use, the awning panel 116 hangs vertically downward in the space provided between the adjacent side walls 22 and 40 of the outer body 12 and the telescoping section 16. When the side wall 22 is lowered to the horizontal position shown by broken lines in FIG. 5, the awning panel 116 can be raised to a near horizontal position to form a cover for the platform. Posts 120, fitted into retainers 122 and 124 on the side wall 22 and awning panel 116, retain the awning panel in an elevated position.

Open work walls 126 support the roller-guiding side rails 60 as well as a number of hideaway tables 128 and 130 each having a planar top panel 132 reinforced by a tubular frame 134. The walls 126 span the length of the outer body 12 and have a height suitable for table use. Cylindrical sleeves 136 secure one side of the tubular frame 134 of each of the tables 128 and 130 to the tops of the walls 126. Opposite the sleeves 136, tubular legs 138 are hingedly attached to the table frames 134 to retain such in a horizontal position for use.

When the hideaway tables 128 and 130 are not in use, they are retained in a vertical, storage position above the walls 126. In this position, the legs 138 are pivoted against the undersurface of the top panels 132 and require minimal storage space within the trailer 10. When use of the tables 128 and 130 is desired, however, the legs 138 are simply pivoted to a position orthagonal to the tables' undersurface. Then, the tables 128 and 130 are lowered to the position shown by broken lines in FIG. 5.

When use of the side wall 22 as a platform is no longer desired, the tables 130 are first returned to their vertical, storage position as described above. Then, the posts 120 are removed from the retainers 122 and 124 and stowed. The awning panel 116 will return to its original, vertical orientation under the influence of gravity. The side wall 22 is next elevated to a vertical position and suitably fastened in place. To assist in elevating the side wall 22 an electric winch (not shown) may be used.

The side wall 40 of the telescoping section 16 includes a pivoting awning panel 140 and a number of fixed beams 142 for supporting the roof 34. The awning panel 140 is attached by hinges 144 to the roof 34 of the telescoping section 16. Typically, the awning panel 140 hangs vertically from the hinges 144 so as to close one side of the telescoping section 16. When the telescoping section 16 is withdrawn from the outer body 12, however, the awning panel 140 can be raised to an elevated position for covering users accessing the now open side of the telescoping section. Struts 146 retain the awning panel 140 in an elevated position.

The telescoping section 16 is provided with hideaway shelves 148. Each of the shelves 148 comprises a planar top 150 reinforced by a tubular frame 152. Cylindrical sleeves 154 attached to time side walls 38 and 40 pivotally retain one side of each frame 152 at a predetermined height above the floor 36. Additional cylindrical sleeves 156 are secured to shelf supporting legs 158 at heights corresponding with counterpart sleeves 154. The sleeves 156 receive, and pivotally retain, a portion of the shelf frames 152 remote from the walls 38 and 40. With this arrangement, then, the shelves 148 may be used and subsequently folded against the side walls 38 and 40 for storage.

Hideaway tables 160, each having a planar top panel 162 reinforced by a tubular frame 164, are positioned between the beams 142 forming part of wall 40. Cylindrical sleeves 166 secure one side of each frame 164 to the floor 36. Opposite the sleeves 166, tubular legs 168 are hingedly attached to the frames 164 to retain such in a horizontal position for use.

When the tables 160 are not in use, they are retained in a vertical, storage position in the wall 40. In this position, the legs 168 are pivoted against the undersurface of the top panels 162. When use of the tables 160 is desired, however, the legs 168 are pivoted to a position orthagonal to the tables' undersurface. Then, the tables 160 are lowered to the position shown in FIGS. 1, 2 and 3.

In FIGS. 7 through 11 may be seen a modified form of a telescoping trailer 200 wherein the manually-actuated jacks 32 and drive assembly 66 have been replaced by self-moving apparatus. It should be noted that the configuration of the modified trailer 200 includes component parts that correspond generally to those of the trailer 10 described hereinabove and, as such, will not be described further. Thus, the following text will be limited to a description of only the modified functional elements of tile invention.

The modified trailer 200 includes an outer body 202 adapted for towing by a land vehicle and a telescoping section 204 for movement in and out of the outer body 202. The outer body 202 has a front wall 206, opposed side walls 208, a roof 210, and a floor 212. The rear end of the outer body 202 is provided with an opening 214 to slidably receive the telescoping section 204. Secured adjacent the front and rear ends of the side walls 208 are hydraulic jacks 216 for levelling the outer body 202.

Each of the jacks 216 is provided with an hydraulic cylinder 218 having a piston rod 220 for extension through an opening in the floor 212. Each of the hydraulic cylinders 216 is operatively connected to an adjacent reservoir/pump assembly 222. Each reservoir/pump assembly 222 is capable of delivering pressurized hydraulic fluid to its associated cylinder 216 in response to signals from a remote, hand-held controller 224 shown in FIG. 11. When a piston rod 220 is extended to the ground surface, a foot plate 226 affixed to its free end engages the ground surface and distributes a portion of the weight of the trailer 200 thereto.

The telescoping section 204 is dimensioned to closely fit within the opening 214. As shown, the telescoping section includes a roof 228, a floor 230, side walls 232, a front wall 233, a rear wall 234 with a hingedly mounted rear door 236. On opposite sides of the door 236, drive assemblies 238 are mounted adjacent the rear wall 234 for automatically extending and retracting the telescoping section 204 from the outer body 202.

Each of the drive assemblies 238 comprises an hydraulic cylinder 240 rigidly secured to the telescoping section 204 and a reservoir/pump assembly 245 for powering the cylinder 240. Projecting from the cylinder 240 is an extensible piston rod 242 positioned for movement through one of a pair of openings 244 in the floor 230. A yoke 246 is affixed to the free end of each piston rod 242 for supporting the axle of a wheel 248. An electric motor 250 is mounted on each yoke 246 and is connected to the wheel axle so as to drive the wheel when the motor 250 is energized. A gear box, not shown, may be employed between the motor 250 and the wheel to increase the mechanical advantage of the motor when rotating the wheel.

Figure 11:
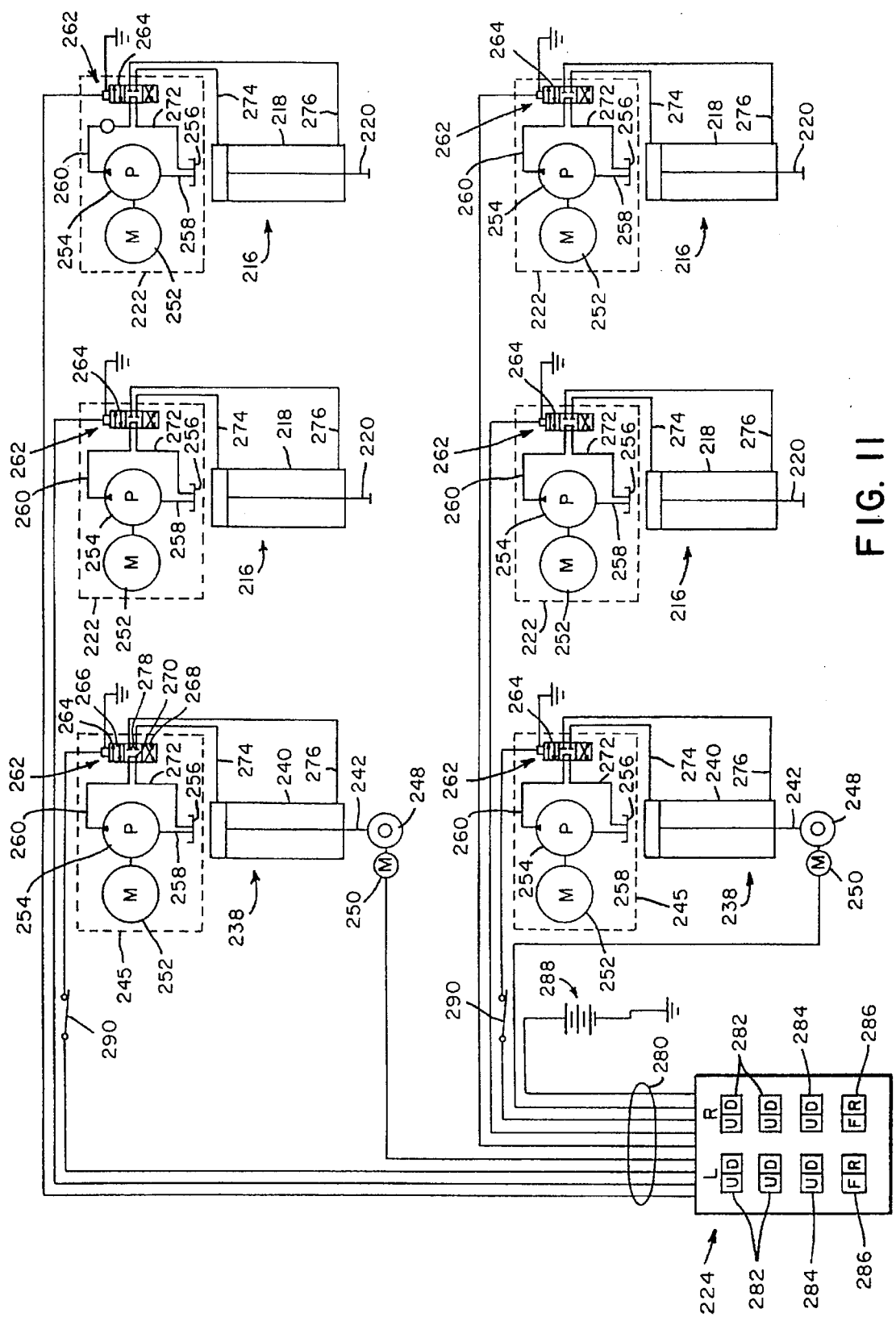
FIG. 11 is a schematic view of a system for levelling the outer body of the trailer of FIG. 7 and selectively extending the telescoping section therefrom.

As shown in FIG. 11, the reservoir/pump assemblies 222 and 245 each include an electric motor 252 for driving a pump 254 which draws hydraulic fluid from a reservoir 256 through a suction conduit 258. From the pump 254, the hydraulic fluid is directed toward one of the cylinders 218 or 240 through a discharge conduit 260. The flow of hydraulic fluid from each discharge conduit 260 is controlled by a solenoid valve 262 which is actuated by means of the hand-held controller 224.

Each solenoid valve 262 is conventional in construction and includes a slide 264 having three sets of channels for directing the flow of hydraulic fluid. The parallel channels 266 in the top of the slide 264, as seen in FIG. 11, permit entry of hydraulic fluid into the cylinders 218 and 240 so as to extend the rods 220 and 242. The crossed channels 268 in the bottom of the slide 264, on the other hand, permit entry of hydraulic fluid into the cylinders 218 and 240 in an opposite sense so as to retract the rods 220 and 242. The U-shaped channel 270 in the center of the slide directs hydraulic fluid from a discharge conduit 260 to an associated reservoir 256 through a return conduit 272 without passage to the cylinders 218 and 240. The return flow of hydraulic fluid from the cylinders 218 and 240 through supply conduits 274 and 276 is prevented by the truncated channels 278 opposite the U-shaped channel 270. Thus, when the central set of channels is exposed to the discharge conduit 260, as shown throughout FIG. 11, no useful work is done by the hydraulic fluid and the cylinders 218 and 240 remain motionless.

Although not shown, a check valve may be placed in each of the discharge conduits 260 to permit the flow of hydraulic fluid from the pumps 254 regardless of the positioning of the solenoid valve slides 264. So that hydraulic fluid is not lost when discharged through such a check valve, the check valve may be connected by a conduit to the reservoir 256 associated with a given pump 254.

The solenoid valves 262 are actuated by the hand-held controller 224 connected thereto by a multi-strand cable 280. The hand-held controller 224 includes, at a minimum, eight switches. Up/down switches 282 control the flow of hydraulic fluid to the leveling cylinders 218 secured to the outer body 202. Up/down switches 284 control the flow of hydraulic fluid to the hydraulic cylinders 240 of the drive assemblies 238 to engage the wheels 248 with the ground and level the telescoping section 204. Motor control switches 286 energize the motors 250 of the drive assemblies 238 to power the wheels 248 and extend and retract the telescoping section 204.

Each of the switches 282, 284 and 286 is of the double throw type, permitting the direction of electrical current to solenoid valves 262 and motors 250 to be reversed. Thus, in a conventional manner, the switches 282 and 284 permit the slides 264 of the solenoid valves 262 to be moved to cause hydraulic fluid to extend and retract the piston rods 220 and 242. Similarly, the switches 286 permit the motors 250 to operate in either of two directions to extend or retract the telescoping section 204.

Low-voltage direct current from a battery 288 is preferably utilized for actuating the solenoid valves 262. The battery 288 is also used to power the motors 252 of the reservoir/pump assemblies 222 and 245 as well as the motors 250 of the drive assemblies 238. As is well known, low-voltage direct current is safe to use in wet environments.

Means are provided for preventing the piston rods 242 from overextending and lifting the roof 228 of the telescoping section 204 into binding engagement with the roof 210 of the outer body 202. Thus, a pair of pump shut-off switches 290, shown schematically in FIG. 11, are secured to the roof 210 adjacent the opening 214. Should the telescoping section 204 be raised too high by either or both drive assemblies 238, the switches 290 will be opened thereby deenergizing the solenoid valve(s) 262 and returning such to a position where the U-shaped channel(s) 270 are connected to the conduit 260. Thus, further upward movement of the telescoping section 204 is prevented.

Figure 9:
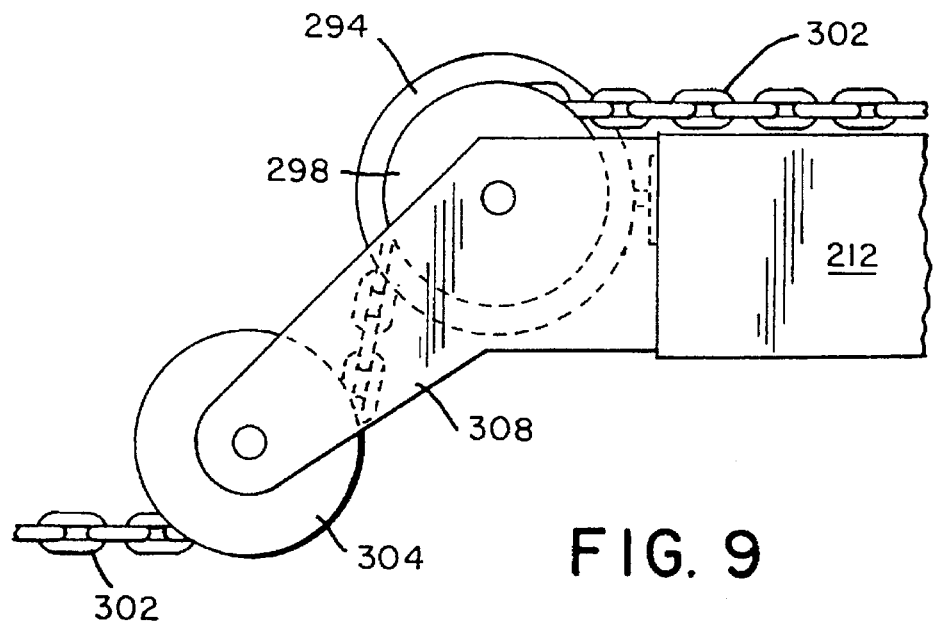
FIG. 9 is a side elevational view a motor assembly for aiding in selectively extending the telescoping section of FIG. 7.
Figure 10:
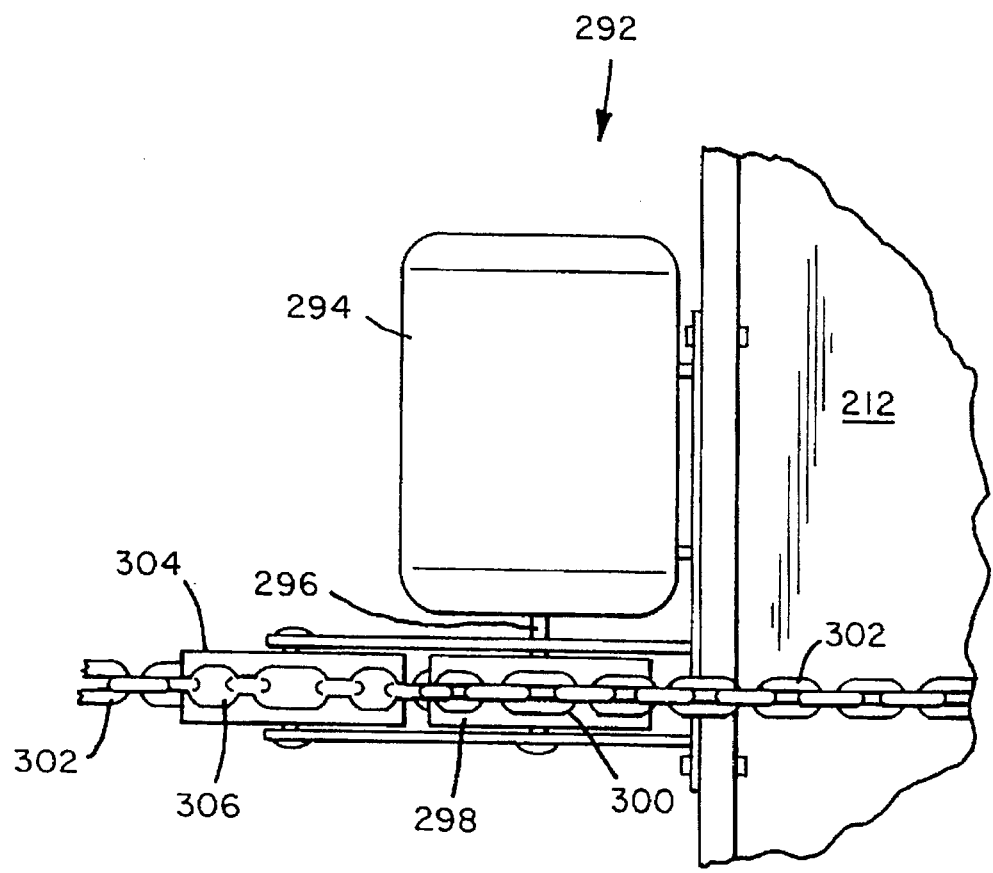
FIG. 10 is a top plan view of the motor assembly of FIG. 9.

Shown in FIGS. 9 and 10 is a chain drive assembly 292 for providing auxiliary power to extend and retract the telescoping section 204. The assembly 292 includes a reversible, electric motor 294 secured to the floor 230 of the outer body 202 beneath the opening 214. The motor 242 is energized by the battery 288 and is preferably provided with an internal gear reduction unit (123:1) to serve as a brake if the motor 294 is deenergized under load. Secured to the drive shaft 296 of the motor 294 is a chain hoist pulley 298 having a peripheral groove 300 adapted to receive and grasp a short portion of a chain 302 secured to opposite ends of floor 230. A guide pulley 304, also having a peripheral groove 306, is rotatably secured to the floor 212 by support brackets 308 to guide the chain 302 and ensure its engagement with pulley 298.

The motor 294 may be selectively actuated by closing a switch (not shown) on the hand-held controller 224 referred to above, to rotate the chain hoist pulley 298 in a counter-clockwise direction as shown in FIG. 9. In so doing, the telescoping section 204 pulled by the chain 302 from the outer body 202. By reversing the rotation of the chain hoist pulley 298, again through the selective closing of a switch, the telescoping section 204 is pulled by the chain 302 into the outer body 202.

It is anticipated that the chain drive assembly 292 and the drive assemblies 238 will be independently operable through the hand-held controller. Thus, when the wheels 248 of the drive assemblies 238 are incapable off obtaining sufficient traction with the ground surface to move the telescoping section 204, the motor 294 of the chain drive assembly 292 may be energized to assist in moving the telescoping section. At all other times, the motor 294 will remain deenergized so that the chain hoist pulley 298 will freewheel on the chain 302 and the drive assemblies 238 alone will move the telescoping section 204.

While the invention has been described with a high degree of particularity, it will be appreciated by those skilled in the art that numerous modifications and substitutions may be made thereto. Therefore, it is to be understood that the present invention is not limited to the several embodiments described above, but encompasses any and all embodiments within the scope of the following claims.

I claim:

1. A telescoping trailer, comprising:

an outer body supported by wheels and having an opening therein, said outer body adapted to be towed by a vehicle;

a telescoping section slidably positioned within said opening;

a drive assembly pivotally secured to said telescoping section for moving said telescoping section within said opening, said drive assembly including:

a tubular sleeve pivotally secured to said telescoping section;

an extensible rod projecting from said tubular sleeve;

a drive wheel secured to the free end of said extensible rod for frictional engagement with the ground;

a rotatable jackscrew connected to said rod for selectively extending and withdrawing said extensible rod from said sleeve;

a support arm having one of its ends secured to the free end of said extensible rod;

a journal box secured to said support arm remote from said extensible rod;

a rotatable shaft in said journal box;

a first sprocket gear secured to said rotatable shaft;

a hand crank secured to said rotatable shaft for rotating said shaft and said first sprocket gear for driving said drive wheel for driving said drive wheel;

a second sprocket gear secured to said drive wheel; and, an endless chain connectinq said first sprocket gear to said second sprocket gear.

2. The telescoping trailer according to claim 1 wherein said telescoping section includes a selectively closable opening for accommodating said drive assembly when such is pivoted from a storage position within said telescoping section to an external operative position.

3. The telescoping trailer according to claim 1 further comprising:

a U-shaped channel member in said telescoping section;

a pivot arm having opposed ends, one of said opposed ends being secured to said tubular sleeve and the other being received within said U-shaped channel member;

a pivot pin traversing said pivot arm and said U-shaped channel member for pivotally securing said pivot arm to said U-shaped channel member; and, a removable locking pin traversing said pivot arm and said U-shaped channel member at a location remote from said pivot pin for selectively preventing pivoting movement of said pivot arm.

* * * * *